(12) United States Patent
Schenck et al.

(10) Patent No.: US 9,022,206 B2
(45) Date of Patent: May 5, 2015

(54) ROLLER CLEANER

(71) Applicant: United States Gypsum Company, Chicago, IL (US)

(72) Inventors: Ronald Edward Schenck, Valparaiso, IN (US); William James Doty, Crown Point, IN (US); Anthony A. Henry, Highland, IN (US)

(73) Assignee: United States Gypsum Company, Chicago, IL (US)

( * ) Notice: Subject to any disclaimer, the term of this patent is extended or adjusted under 35 U.S.C. 154(b) by 200 days.

(21) Appl. No.: 13/729,329

(22) Filed: Dec. 28, 2012

(65) Prior Publication Data

US 2014/0183001 A1    Jul. 3, 2014

(51) Int. Cl.
*B65G 45/10*    (2006.01)
*B65G 45/18*    (2006.01)
*B08B 1/04*    (2006.01)
*B08B 1/00*    (2006.01)

(52) U.S. Cl.
CPC . *B65G 45/10* (2013.01); *B08B 1/04* (2013.01); *B08B 1/008* (2013.01)

(58) Field of Classification Search
None
See application file for complete search history.

(56) References Cited

U.S. PATENT DOCUMENTS

| | | | |
|---|---|---|---|
| 3,481,727 A | | 12/1969 | Dickinson |
| 4,042,364 A | * | 8/1977 | King et al. .................. 65/168 |
| 5,833,106 A | * | 11/1998 | Harris ........................ 226/17 |
| 6,170,293 B1 | * | 1/2001 | Cody .......................... 65/168 |

* cited by examiner

*Primary Examiner* — Kavel Singh
(74) *Attorney, Agent, or Firm* — Greer, Burns & Crain, Ltd.; Pradip Sahu; Philip T. Petti

(57) ABSTRACT

A cleaning device is provided for removing debris from rotating conveyor rollers, and includes a housing constructed and arranged for insertion between two adjacent rotating rollers, the housing having a first set of cleaning wheels at a first housing end associated with a first of the conveyor rollers, and a second set of cleaning wheels located on an opposite end of the housing and associated with a second of the conveyor rollers. At least one of the cleaning wheels is reciprocable relative to the housing between a retracted position permitting insertion of the housing between the rollers, and a extended position extending the reciprocating wheel towards the adjacent roller for limiting lateral movement of the housing between the rollers. Upon movement of the housing between the rollers in a direction parallel to a longitudinal axis of the rollers, the cleaning wheels operationally engage and remove residue collected on the rollers.

18 Claims, 7 Drawing Sheets

ROLLER CLEANER

BACKGROUND

The present invention relates to devices used for cleaning conveyor rollers, and in particular, devices used for removing debris from conveyor rollers in production plants used for producing wallboard and other types of construction panels on moving conveyor belts.

As is well known in the art, the production of wallboard involves laying a first sheet of paper upon a moving conveyor belt, followed by addition of a gypsum slurry. Another layer of face paper is applied upon the setting slurry. The assembly is formed by specialized plates along the top and at the sides if necessary, and then forwarded to an oven for drying. Next, the dried board is cut to size. Other construction panels used to form walls, floors, ceilings and the like are similarly constructed, and often include cement, fiberglass, wood fibers in slurry format, all of which create unwanted residue on conveyor belts and the underlying support rollers.

It is not uncommon for excess slurry to spill over the sides of the conveyor belt, or otherwise become deposited upon the rollers supporting the belt. Such deposits cause uneven travel of the belt, which can cause dimples in the resulting board or otherwise interfere with the resulting wallboard appearance. Thus, wallboard production practitioners need to periodically clean the surfaces of the conveyor rollers for obtaining desired conveyor performance. In particular, when fiberglass construction panels are produced on the same production lines, the deposits often require more aggressive cleaning.

Since board production lines operate almost continuously, if the cleaning operation is performed while the conveyor is stopped, production suffers. Operators conventionally employ powered buffers or wire wheels for removing the residue from stalled conveyor rollers. On the other hand, cleaning the rollers while they are moving has proved difficult to accomplish. Hand scrapers are the chosen tool for this operation. Under normal wallboard production conditions, the conveyor belt and the free-spinning idler rollers are moving relatively quickly, which interferes with the cleaning process.

Thus, there is a need for a solution to the problem of removing residue from conveyor rollers, particularly such rollers used in wallboard or construction panel production plants, and when such rollers are in operation.

SUMMARY

The above-identified need is met by the present roller cleaner, which is readily employed by production line operators while the conveyor is moving. Features of the cleaner include multiple rotating cleaning or bearing wheels that scrape residue from the rotating conveyor rollers as the cleaner is moved parallel to the axis of roller rotation. The cleaner has a housing with such cleaning wheels mounted at multiple locations for engaging surfaces of adjacent conveyor rollers. Preferably, at least one of such bearing wheels is retractable for facilitating insertion between the rollers, then extendable to an extended position for retaining the cleaner in position between the rollers for desired coaxial reciprocating cleaning strokes. In addition, the extendable cleaning wheel exerts a biasing force against the respective rotating conveyor roller which increases the pressure exerted on all of the other cleaning wheels against their corresponding conveyor rollers. A powered cylinder is preferably provided for biasing the retractable wheel towards the conveyor roller.

In addition, an elongate handle is connected to the device for facilitating operator control along the full length of the conveyor rollers. Connection of the handle to the housing of the cleaner is accomplished with a swivel joint, facilitating independent movement of the cleaner relative to the moving rollers. A telescoping sleeve is provided on the handle, and when desired, the operator moves the sleeve over the swivel joint to neutralize the joint and the resulting independent movement. Neutralization of the swivel joint creates a stiff connection between the handle and the housing for facilitating proper location of the housing between the rollers prior to cleaning, and also for proper extraction of the housing from the rotating rollers after cleaning is completed.

More specifically, a cleaning device is provided for removing debris from rotating conveyor rollers, and includes a housing constructed and arranged for insertion between two adjacent rotating rollers, the housing having a first set of cleaning wheels at a first housing end associated with a first of the conveyor rollers, and a second set of cleaning wheels located on an opposite end of the housing and associated with a second of the conveyor rollers. At least one of the cleaning wheels is reciprocable relative to the housing between a retracted position permitting insertion of the housing between the rollers, and an extended position extending the reciprocating wheel towards the adjacent roller for limiting lateral movement of the housing between the rollers and for biasing the at least one cleaning wheel against the corresponding conveyor roller. Upon movement of the housing between the rollers in a direction parallel to a longitudinal axis of the rollers, the cleaning wheels operationally engage and remove residue collected on the rollers.

In another embodiment, a cleaning device is provided for removing buildup simultaneously from two adjacent rotating rollers, and includes a housing having a first set of cleaning wheels in operational relationship to a first of the rotating rollers, and a second set of cleaning wheels in operational relationship to a second one of the rotating rollers. An elongated handle is connected to the housing with a swivel joint, and a retractable sleeve is telescopingly engaged on the handle for selectively neutralizing the swivel joint. Upon insertion of the housing between the adjacent conveyor rollers, and manipulation of the handle for moving the housing along the rollers in a direction parallel to an axis of the rollers, the first and second sets of cleaning wheels engage surfaces of the rollers and remove unwanted deposits.

In yet another embodiment, a method of removing debris simultaneously from two adjacent rotating rollers is provided, and includes providing a cleaning device for removing debris from rotating conveyor rollers, having a housing constructed and arranged for insertion between two adjacent rotating rollers; the housing having a first set of cleaning wheels at a first housing end associated with a first of the conveyor rollers, and a second set of cleaning wheels located on an opposite end of the housing and associated with a second of the conveyor rollers; at least one of the cleaning wheels being reciprocable relative to the housing between a retracted position permitting insertion of the housing between the rollers, and an extended position extending the reciprocating wheel towards the adjacent roller for limiting lateral movement of the housing between the rollers and for biasing the reciprocable wheel against the corresponding conveyor roller; inserting the housing between the rollers with the at least one reciprocable cleaning wheel in the retracted position; operationally engaging at least one of the first set and the second set of cleaning wheels upon the rollers by positioning the housing; moving the reciprocable cleaning wheel to the extended position so that it engages a corresponding rotating conveyor roller; and reciprocating the housing in a direction parallel to an axis of rotation of the rollers so that the sets of cleaning wheels engage the rotating surface of the conveyor rollers and remove debris therefrom.

DETAILED DESCRIPTION

Figure 1:
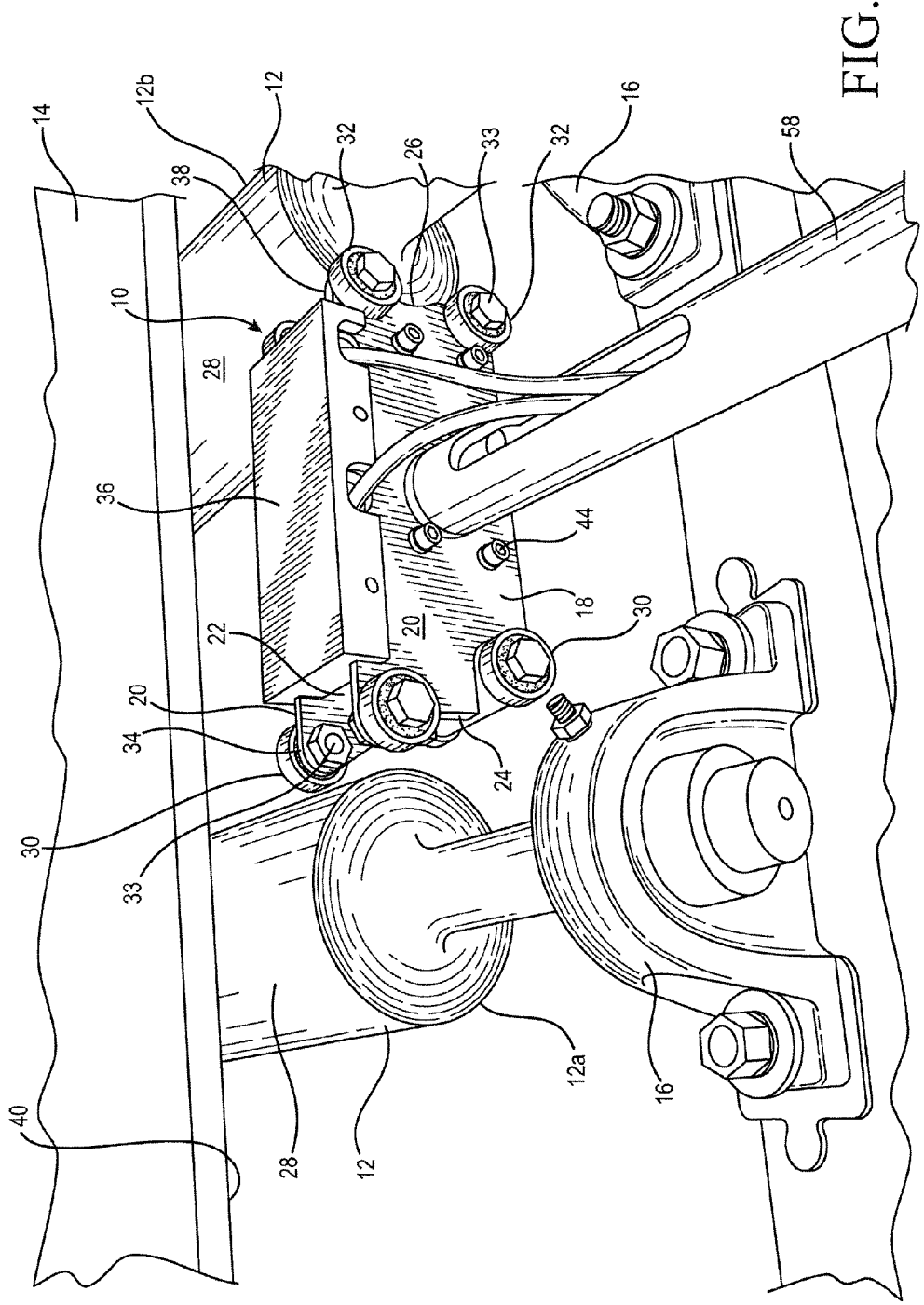
FIG. 1 is a top perspective view of the present roller cleaner being inserted into a conveyor system.

Referring to FIG. 1, the present roller cleaner, also referred to as a cleaning device, is generally designated 10 and is shown being operationally inserted between two adjacent conveyor rollers 12 supporting a rotating, endless conveyor belt 14 of the type conventionally used in production plants used for making construction panels such as gypsum wallboard, ceiling tile, cement board, fiberglass board, office partitions, and the like. As described above, the production of such panels involves applying a slurry to the moving conveyor belt 14. Through operation, eventually the rollers 12 become covered with unwanted deposits. Periodic cleaning of the rollers 12 is helpful in maintaining desired product quality and production rates. As is well known in the art, the conveyor belt 14 is driven by a drive roller (not shown) and the depicted rollers 12 are idler rollers rotating in pillow block bearings 16. However, it is contemplated that the present roller cleaner 10 is also useful for cleaning such drive rollers. While other roller spacings are contemplated, depending on the application, in the preferred embodiment, the target rollers 12 for cleaning are spaced at least 12 inches (30 cm) on center, and also, the rollers have a minimum diameter of 4 inches (10 cm).

Figure 2:
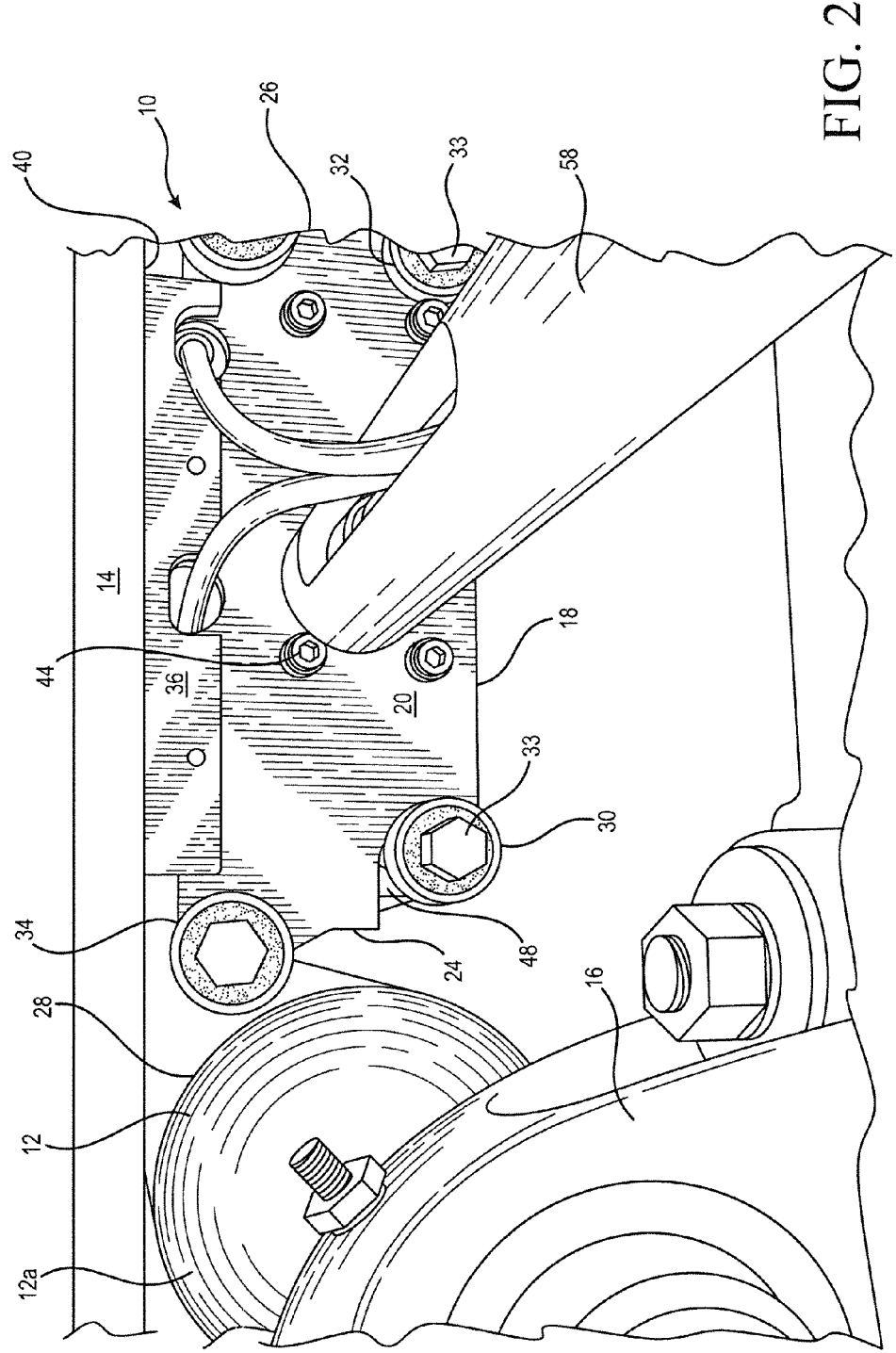
FIG. 2 is a side view of the conveyor system of FIG. 1 showing the roller cleaner being inserted and being in a retracted position.
Figure 3:
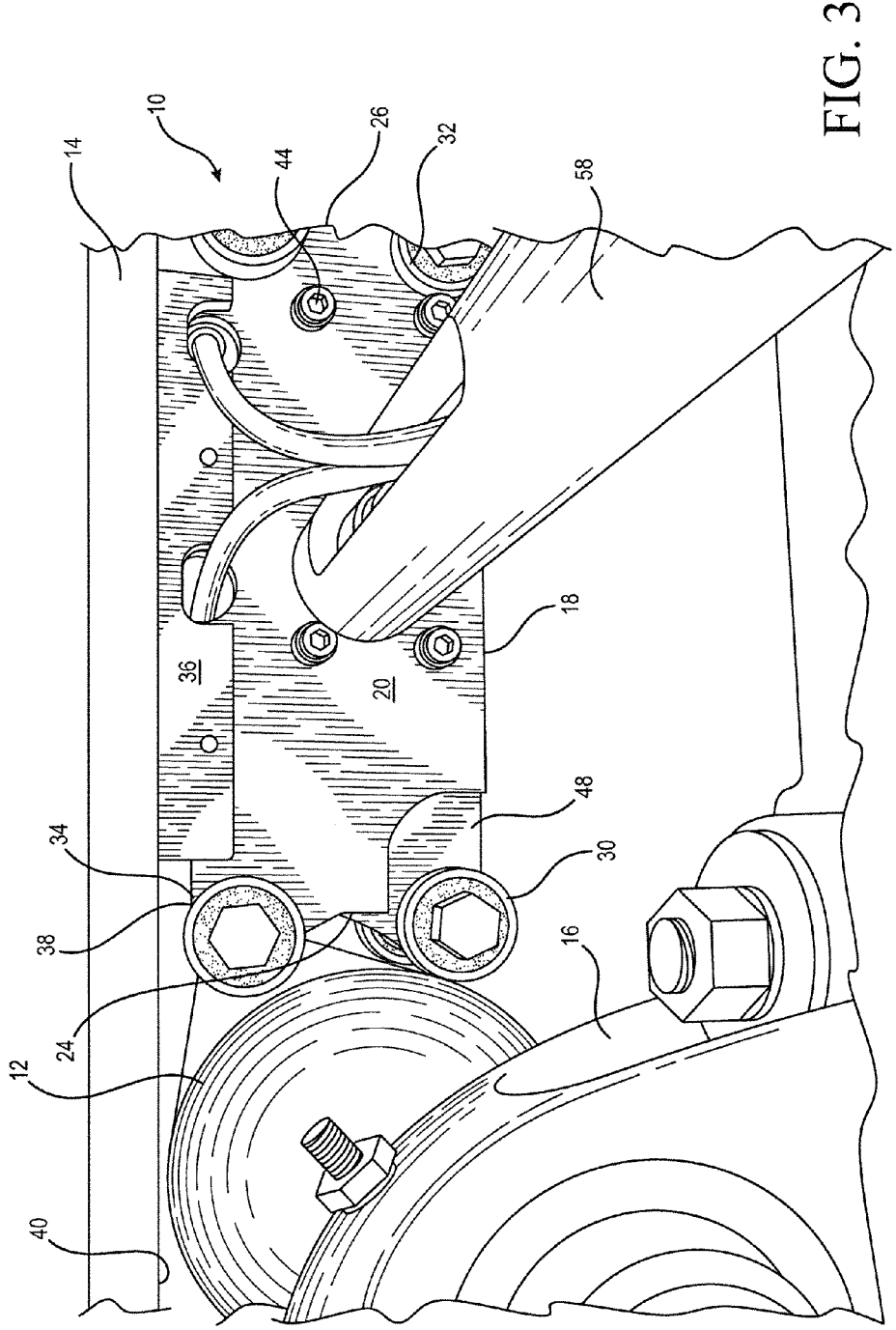
FIG. 3 is a side view similar to FIG. 2 showing the roller cleaner in an extended position.
Figure 7:
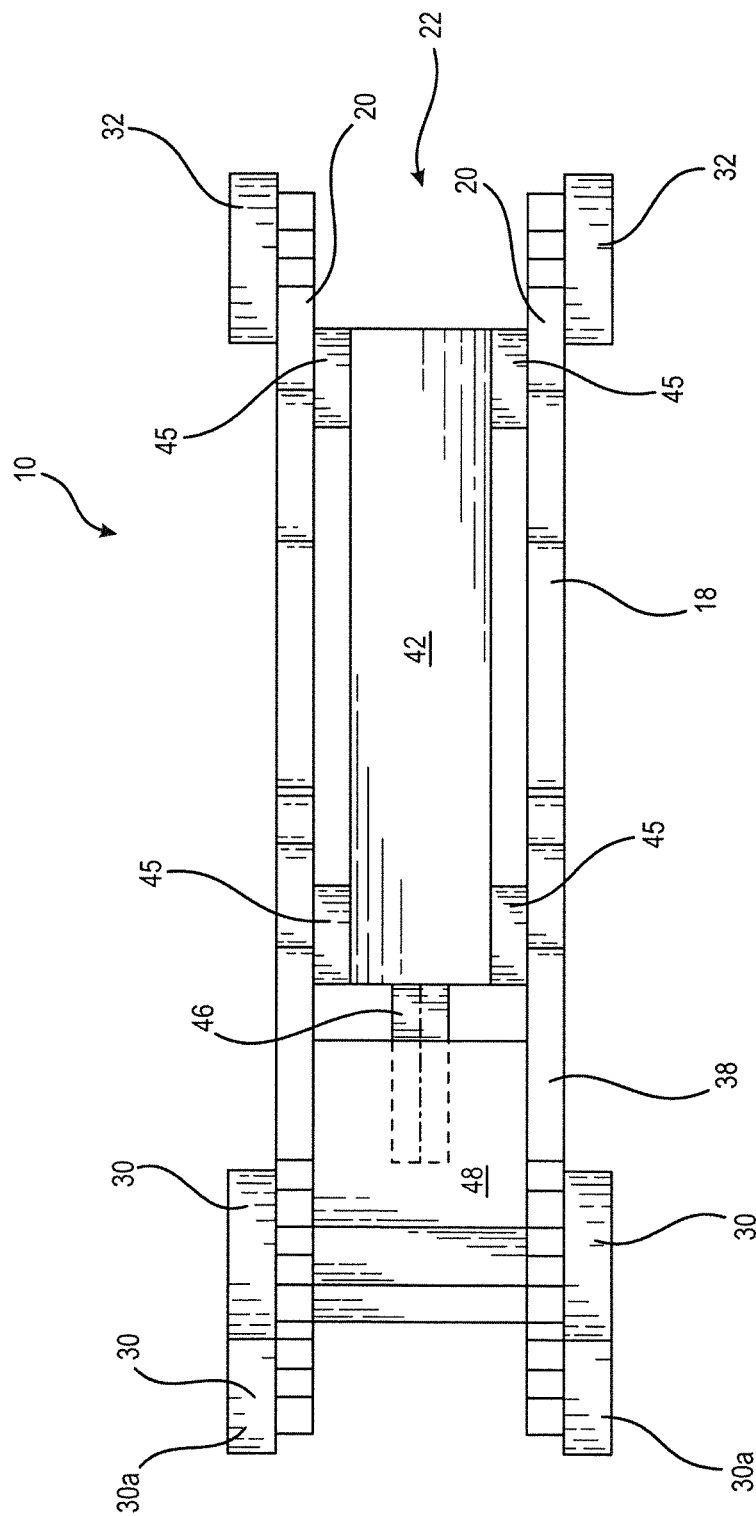
FIG. 7 is a fragmentary overhead plan view of the present roller cleaner.

Referring now to FIGS. 2, 3 and 7, the roller cleaner 10 has a housing 18 formed from a pair of generally planar plates 20 disposed in parallel, spaced relationship and forming a gap 22 therebetween. Each of the plates 20 has a first and second end 24, 26, depicted respectively as right and left ends, also each preferably partially arcuate in shape for generally corresponding to a cylindrical exterior 28 of the adjacent roller 12. The housing 18 is dimensioned for insertion between two adjacent rollers 12.

An important feature of the housing 18 is that a first set of cleaning wheels 30 is located at the first housing end 24 and is associated with a first of the conveyor rollers, designated 12a, and a second set of cleaning wheels 32 is located on an opposite end of the housing and is associated with a second of the conveyor rollers, designated 12b (FIG. 1). While only two such conveyor rollers 12a, 12b (FIG. 1) are described here, it will be understood that the present roller cleaner 10 is insertable between any two adjacent conveyor rollers in a particular conveyor. For the purposes of the present application, all of the cleaning wheels 30, 32 are identical in diameter and construction, and are preferably conventional roller bearings similar to those available through industrial supply distributors and known as annular contact bearings, spherical roller bearings or radial ball bearings, among other common designations. As such, the wheels 30, 32 rotate freely relative to the housing 18, and are preferably secured to the respective housing plate 20 by threaded fasteners 33 such as bolts and nuts or the like.

It will be understood that each of the spaced housing plates 20 has a corresponding cleaning wheel 30, 32 at the same, aligned location such that both wheels at that location engage the corresponding conveyor roller 12 at the same time. It will be seen that each set of wheels 30, 32 includes vertically spaced wheels located adjacent corners 34 of the housing 18 for engaging the corresponding conveyor rollers 12a, 12b (FIG. 1) at two points. In other words, as the housing 18 is depicted in FIGS. 2 and 3, there are upper and lower cleaning wheels 30 and 32 on each housing end 24, 26.

Referring now to FIGS. 1-6, the housing 18 is preferably fitted with a plate 36, mounted along an upper edge 38 of the housing, for protecting an underside 40 of the endless belt 14 during roller cleaning, as described in greater detail below. While a variety of materials are contemplated, the plate 36 is preferably made of a block of rigid plastic, and is secured to the housing 18 using threaded fasteners, chemical adhesive, or the like.

Figure 4:
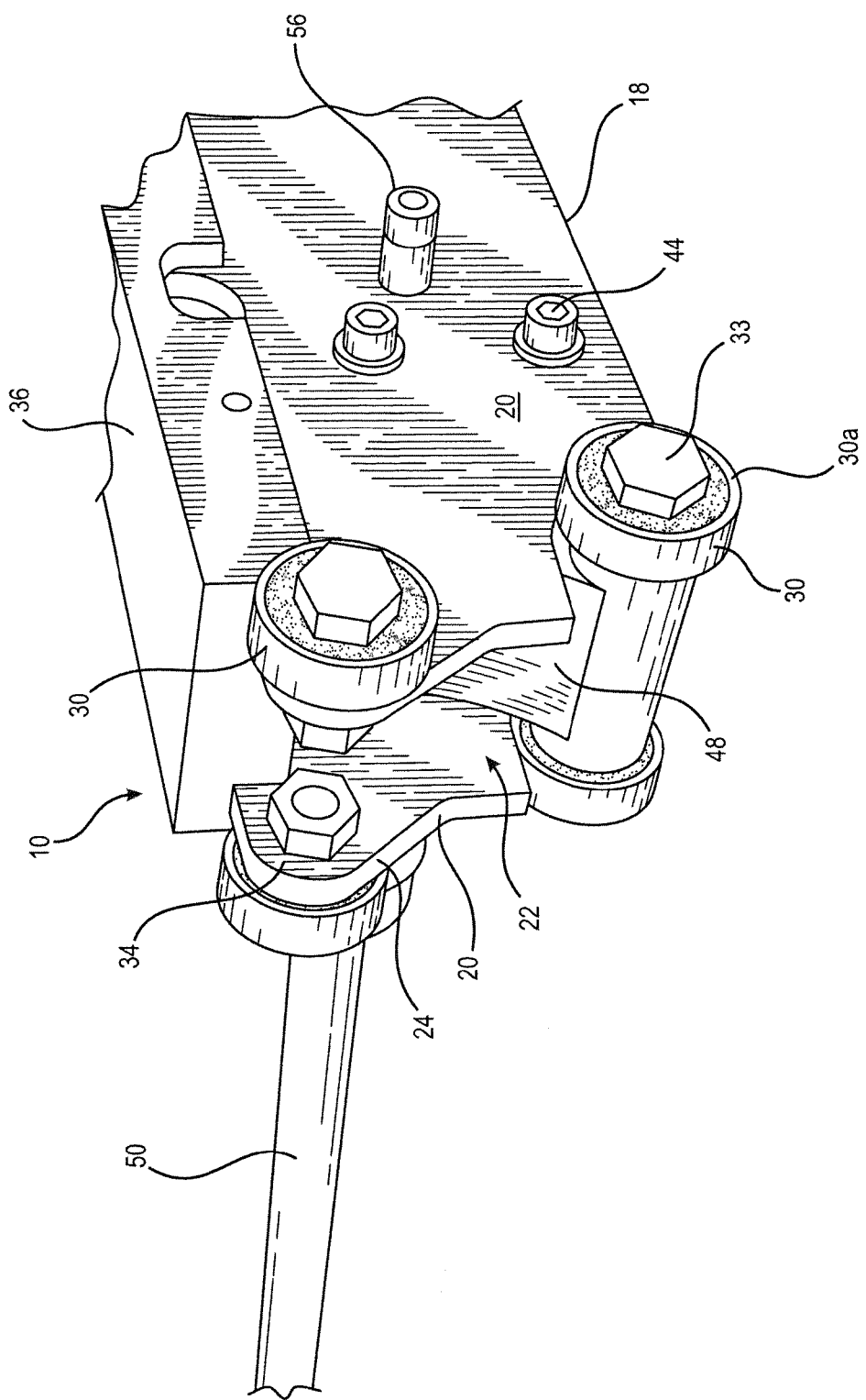
FIG. 4 is an enlarged fragmentary perspective view of the present roller cleaner in the retracted position.
Figure 5:
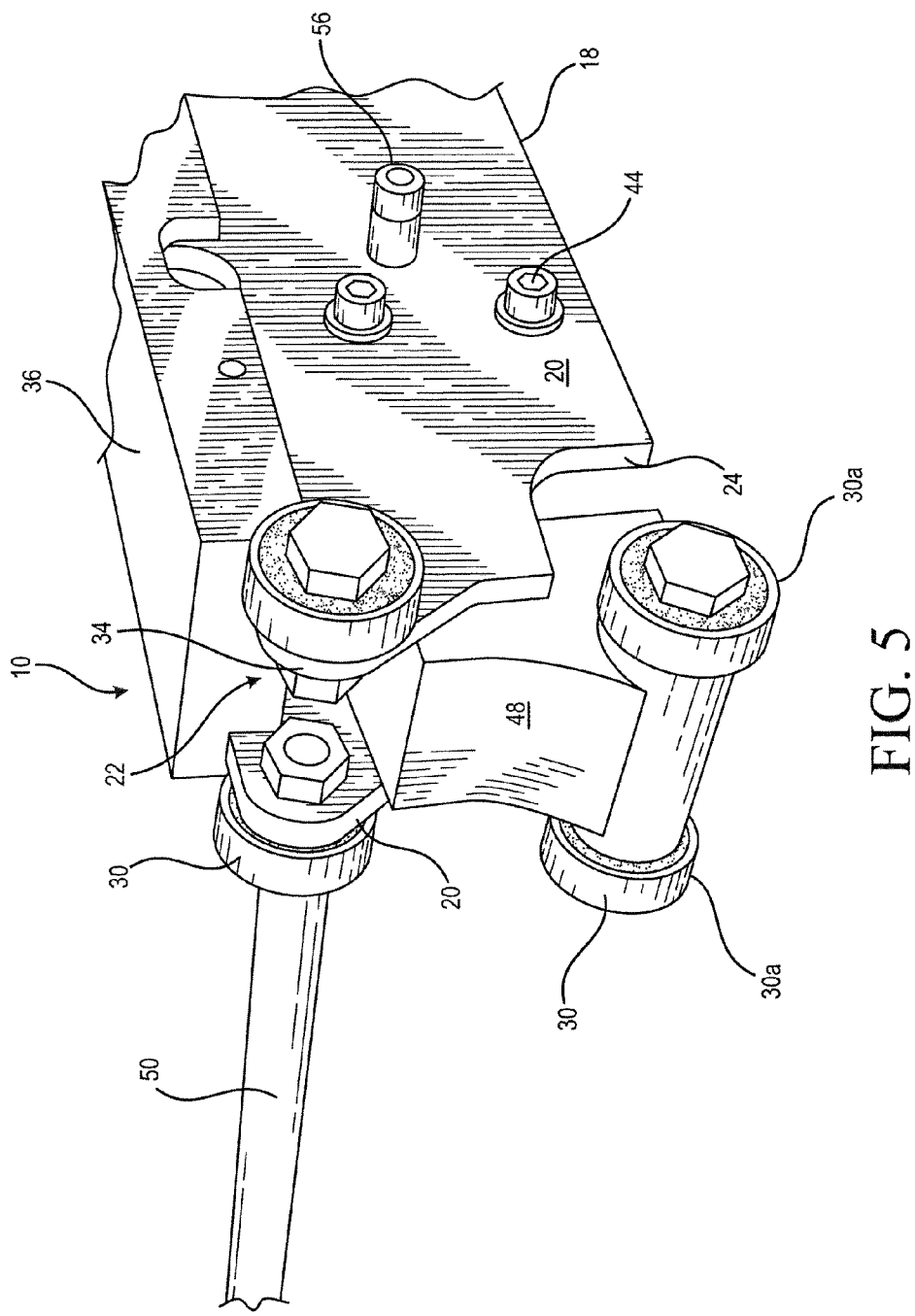
FIG. 5 is an enlarged fragmentary perspective view of the present roller cleaner in the extended position.
Figure 6:
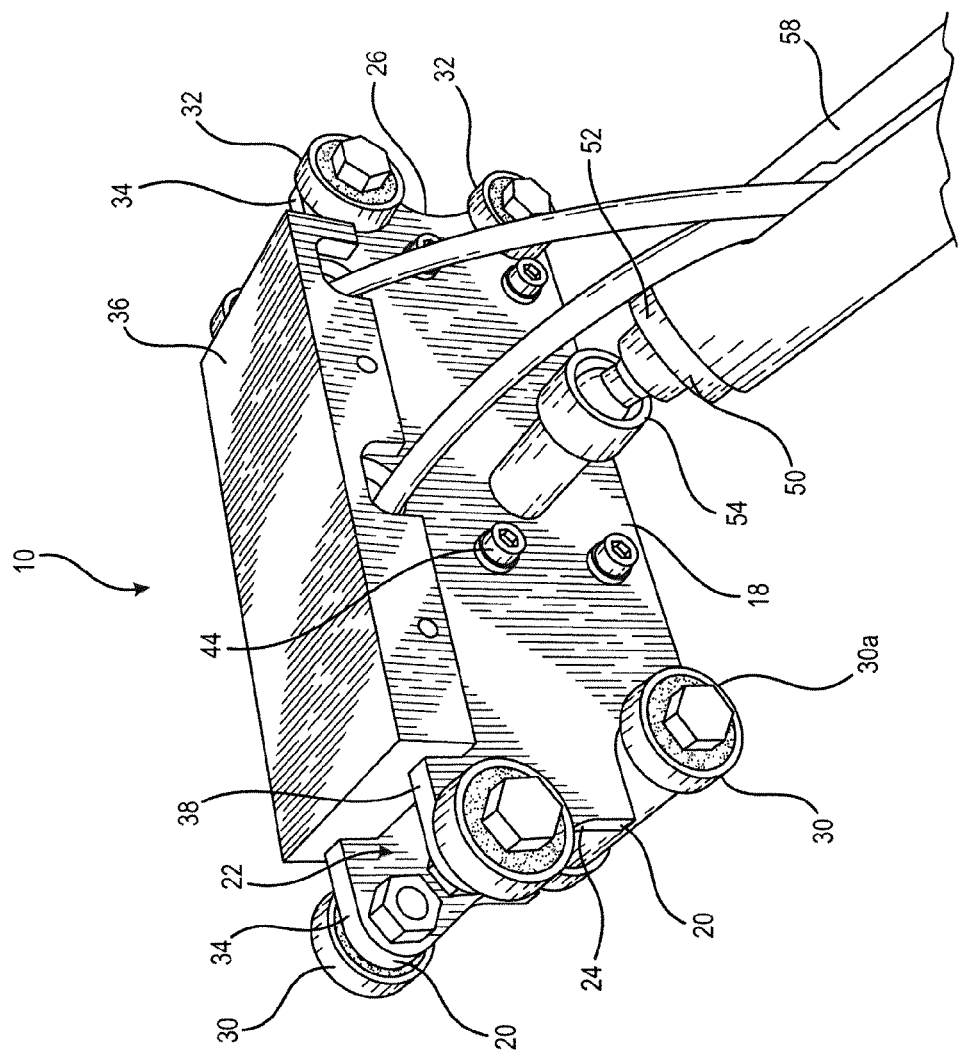
FIG. 6 is a fragmentary top perspective view of the present roller cleaner including the ball and socket connection with the handle.

Another feature of the present roller cleaner 10 is that at least one of the cleaning wheels, here designated as 30a, is reciprocable relative to the housing 18 between a retracted position permitting insertion of the housing between the rollers 12a, 12b (FIGS. 1, 2 and 4), and an extended position extending the reciprocating wheel 30a towards the adjacent roller 12a for limiting lateral movement of the housing between the rollers (FIGS. 3 and 5). This reciprocability of the cleaning wheel 30a allows sufficient clearance for the insertion of the device 10 between the adjacent rollers 12a, 12b, and once in position, the extension of the wheel 30a securely positions the device in place, while permitting movement of the housing between the rollers in a direction parallel to a longitudinal axis of the rollers. In addition, the movement of the at least one wheel 30a (in the preferred embodiment there are two such wheels) is biased against the corresponding conveyor roller 12a, which increases the compressive force exerted by the wheel 30a against the roller for improved cleaning, and also increases the pressure of the remaining cleaning wheels 30, 32 against their corresponding conveyor rollers 12a, 12b. Through such movement, the cleaning wheels 30, 32 operationally engage and remove residue collected on the rollers 12. More specifically, the deposits are crushed by the pressured rotation of the cleaning wheels 30, 32 against the conveyor rollers 12.

Referring now to FIGS. 4, 5 and 7, the reciprocation of the cleaning wheels 30a is preferably achieved by placing a fluid power cylinder 42, here preferably a dual acting pneumatic cylinder energized by an operator-controlled foot switch (not shown) in the gap 22 between the housing plates 20. The amount of pressure exerted by the wheels 30a is adjusted by an operator-controlled regulator (not shown). Alternatively, the wheels 30a can be caused to reciprocate by a spring-return fluid power cylinder, a spring biased assembly controlled by a Bowden cable, or the like. In the preferred embodiment, the attachment of the cylinder 42 to the corresponding plates 20 is via threaded fasteners 44 and spacers 45, which result in the cylinder and the plates forming a unit. A rod 46 of the cylinder 42 is attached to a slider 48 which slidingly reciprocates in the gap 22 as the cylinder is extended and retracted. It will be seen that the wheels 30a attached to the slider 48 and associated with each of the housing plates 20 are axially aligned. Also, the slider 48 has sufficient mass to withstand the operational torque forces generated by the rotating conveyor rollers 12.

Referring now to FIGS. 1, 2, 3 and 6, to facilitate movement of the housing 18 relative to the conveyor rollers 12 in a direction parallel to the longitudinal axis of the rollers, the housing is provided with an elongate handle 50 having a sufficient length for moving the housing along the full axial length of each of the rollers 12. One end 52 of the handle 50 is connected to the housing 18 using a swivel joint 54. While a variety of swivel joints known in the art are contemplated, the preferred swivel joint 54 is a ball and socket joint, also referred to as an anti-torque knuckle. It has been found that a ball and socket joint effectively resists the torque exerted on the housing 18 by the handle 50 as the operator pushes and pulls the housing back and forth relative to the rollers 12. The swivel joint 54 is preferably secured to the adjacent plate 20 by fastening to a stud 56 (FIGS. 4 and 5), welding, or similar well known fastening techniques.

To resist the torque forces generated by the handle during insertion of the housing 18, a retractable sleeve 58 is telescopingly engaged on the handle 50 and is dimensioned to surround and temporarily disable the swivel joint 54 when the sleeve 58 is placed adjacent the plate 20. In this manner, the housing 18 and the handle 50 become a fixed unit once the sleeve 58 is in place as shown in FIGS. 1-3. After the housing 18 is appropriately positioned between the rollers 12 and the wheels 30a extended, the sleeve 58 is retracted from the swivel joint 54 (FIG. 6), and the housing 18 with the attached cleaning wheels 30, 32, can then move independently of the rollers and is less subject to damaging torque forces, which have been known to prematurely wear the cleaning wheels. Also, upon retraction of the sleeve 58 relative to the handle 50, the handle is moveable up and down and side-to-side without transferring torque to the cleaning wheels 30, 32. Thus, the handle can be easily manipulated by the operator to move the housing 18 back and forth in reciprocating fashion along the length of the conveyor rollers 12 and parallel to the longitudinal axis of the rollers for removing the unwanted deposits.

While a particular embodiment of the present roller cleaner has been shown and described, it will be appreciated by those skilled in the art that changes and modifications may be made thereto without departing from the invention in its broader aspects and as set forth in the following claims.

What is claimed:

1. A cleaning device for removing debris from rotating conveyor rollers, comprising:
   a housing constructed and arranged for insertion between two adjacent rotating rollers;
   said housing having a first plurality of cleaning wheels at a first housing end associated with a first of the conveyor rollers, and a second plurality of cleaning wheels located on an opposite end of the housing and associated with a second of the conveyor rollers;
   at least one of said cleaning wheels being reciprocable relative to said housing between a retracted position permitting insertion of said housing between the rollers, and an extended position extending said reciprocating wheel towards the adjacent roller for limiting lateral movement of said housing between the rollers, and for biasing the at least one cleaning wheel against the corresponding conveyor roller;
   a fluid power cylinder in said housing for biasing said at least one reciprocable cleaning wheel towards said adjacent roller;
   wherein, upon movement of said housing between the rollers in a direction parallel to a longitudinal axis of the rollers, said cleaning wheels operationally engage and remove residue collected on the rollers; and
   said at least one reciprocable cleaning wheel being reciprocal relative to said housing in a direction transverse to the axis of the rollers.

2. The cleaning device of claim 1, wherein each of said first and second pluralities of cleaning wheels includes vertically spaced cleaning wheels mounted adjacent corners of said housing for engaging the corresponding conveyor roller.

3. The cleaning device of claim 2, wherein said first plurality of wheels is located at an upper portion of said housing, and said second plurality is located at a lower portion of said housing.

4. The cleaning device of claim 2, wherein each said housing end is arcuate for corresponding to a profile of the conveyor rollers, and said pluralities of cleaning wheels are located along said arcuate end.

5. The cleaning device of claim 1, further comprising a plate disposed on said housing for protecting a belt located on the rollers from unwanted wear caused by contact with said device.

6. The cleaning device of claim 1, further comprising an elongated handle connected at one end to said housing with a swivel joint.

7. The cleaning device of claim 6, further including a retractable sleeve telescopingly mounted to said handle for selectively covering and neutralizing said swivel joint.

8. The cleaning device of claim 6 wherein said swivel joint is a ball and socket joint.

9. The cleaning device of claim 1, wherein said fluid power cylinder is connected to said reciprocating cleaning wheel.

10. The cleaning device of claim 1, wherein said housing includes a pair of spaced plates defining a gap, and said fluid power cylinder is secured in said gap.

11. The cleaning device of claim 9, wherein said at least one cleaning roller is connected to a slider directly powered by said fluid power cylinder.

12. The cleaning device of claim 11, wherein said slider includes a pair of said cleaning wheels disposed along an axis parallel to the conveyor axis of rotation.

13. A cleaning device for removing buildup simultaneously from two adjacent rotating rollers, comprising:
   a housing having a first plurality of cleaning wheels in operational relationship to a first of the rotating rollers, and a second plurality of cleaning wheels in operational relationship to a second one of the rotating rollers;
   an elongated handle connected to said housing with a swivel joint; and
   a retractable sleeve telescopingly engaged on said handle for selectively covering and neutralizing a swiveling action of said swivel joint;
   upon insertion of said housing between the adjacent conveyor rollers, and manipulation of said handle for moving said housing along the rollers in a direction parallel to an axis of the rollers, said first and second pluralities of cleaning wheels engaging surfaces of the rollers and removing unwanted deposits.

14. The cleaning device of claim 13, wherein said housing includes a pair of spaced plates defining a gap, and a fluid power cylinder located in said gap and connected to at least one of said cleaning wheels for causing reciprocation of said connected wheels between a retracted position and an extended position.

15. The cleaning device of claim 13, further comprising a plate disposed on said housing for protecting a belt located on the rollers from unwanted wear caused by contact with said device.

16. A method of removing debris simultaneously from two adjacent rotating rollers, comprising:
provides a cleaning device for removing debris from rotating conveyor rollers, including:
a housing constructed and arranged for insertion between two adjacent rotating rollers;
said housing having a first plurality of cleaning wheels at a first housing end associated with a first of the conveyor rollers, and a second plurality of cleaning wheels located on an opposite end of the housing and associated with a second of the conveyor rollers;
at least one of said cleaning wheels being reciprocable relative to said housing between a retracted position permitting insertion of said housing between the rollers, and an extended position extending said reciprocating wheel towards the adjacent roller for limiting lateral movement of said housing between the rollers and for biasing the reciprocable wheel against the corresponding conveyor roller;
inserting said housing between the rollers with said at least one reciprocable cleaning wheel in the retracted position;
operationally engaging at least one of said first plurality and said second plurality of cleaning wheels upon the rollers by positioning said housing;
moving, in a direction transverse to an axis of rotation of the rollers and using a fluid power cylinder in said housing, said reciprocable cleaning wheel to the extended position so that it engages a corresponding rotating conveyor roller; and
reciprocating said housing in a direction parallel to an the axis of rotation of the rollers so that said pluralities of cleaning wheels engage the rotating surface of the conveyor rollers and remove debris therefrom.

17. The method of claim 16, further comprising providing an elongate handle connected to the housing by a swivel joint, and having a telescoping sleeve slidably engaged upon said handle, and sliding said sleeve over the swivel joint when said housing is inserted between said rollers, and upon said reciprocable roller being moved to the extended position, retracting said sleeve from the ball and socket joint for allowing said housing to move independently of the rollers.

18. The method of claim 16, further including disposing a plate on said housing for protecting a belt located on the rollers from unwanted contact with said device.

* * * * *